/

US007111303B2

(12) United States Patent
Macchiano et al.

(10) Patent No.: US 7,111,303 B2
(45) Date of Patent: Sep. 19, 2006

(54) VIRTUAL MACHINE OPERATING SYSTEM LAN

(75) Inventors: Angelo Macchiano, Apalachin, NY (US); Dennis Musselwhite, Hallstead, PA (US); Richard Tarcza, Kingston, NY (US); W. Romney White, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 10/197,306

(22) Filed: Jul. 16, 2002

(65) Prior Publication Data

US 2004/0015966 A1 Jan. 22, 2004

(51) Int. Cl.
  G06F 9/46 (2006.01)
  G06F 15/16 (2006.01)
(52) U.S. Cl. ............ 719/313; 719/312; 719/319; 719/321; 709/200; 709/213; 709/245; 718/1
(58) Field of Classification Search ............ 718/1; 719/319–328, 312–313; 370/312; 710/240; 709/200, 213
See application file for complete search history.

(56) References Cited

U.S. PATENT DOCUMENTS

| | | | | |
|---|---|---|---|---|
| 6,081,833 | A * | 6/2000 | Okamoto et al. | 709/213 |
| 6,233,619 | B1 * | 5/2001 | Narisi et al. | 709/230 |
| 6,314,501 | B1 * | 11/2001 | Gulick et al. | 711/153 |
| 6,389,482 | B1 * | 5/2002 | Bobak et al. | 719/312 |
| 6,496,847 | B1 * | 12/2002 | Bugnion et al. | 718/1 |
| 6,629,178 | B1 * | 9/2003 | Smith | 710/240 |
| 6,671,743 | B1 * | 12/2003 | Verity | 719/321 |
| 6,795,966 | B1 * | 9/2004 | Lim et al. | 718/1 |
| 6,934,269 | B1 * | 8/2005 | Hasha et al. | 370/312 |
| 7,020,532 | B1 * | 3/2006 | Johnson et al. | 700/89 |
| 2002/0046304 | A1 * | 4/2002 | Fabri et al. | 709/331 |
| 2002/0143842 | A1 * | 10/2002 | Cota-Robles et al. | 709/1 |
| 2003/0037178 | A1 * | 2/2003 | Vessey et al. | 709/319 |

OTHER PUBLICATIONS

VMware Workstation User's Manual, Version 3.0.

(Continued)

Primary Examiner—Lewis A. Bullock, Jr.
Assistant Examiner—Jennifer N. To
(74) Attorney, Agent, or Firm—Arthur J. Samodovitz (57) ABSTRACT

A virtual machine operating system for communication between first and second applications which execute in different user portions of the virtual machine operating system and use Internet Protocol (IP). The virtual machine operating system comprises a first user portion, a second user portion and a base portion. The first user portion executes the first application and includes a first device driver for a first virtual network interface card (NIC). The second user portion executes the second application and includes a second device driver for a second virtual NIC. The base portion is shared by the first and second user portions and includes the first and second virtual NICs. The base portion maintains a table of IP addresses by which each device driver addresses its respective NIC and other, corresponding addresses by which the base portion addresses the virtual NIC. The first device driver is programmed to receive an IP datagram from the first application and pass it to the first NIC using IP. The datagram includes an IP address of the second virtual NIC and an indication that the second application should receive the datagram. The base portion is programmed to determine the other address of the second NIC based on the table and transfer the datagram to a storage location associated with the second virtual NIC or the second device driver.

25 Claims, 3 Drawing Sheets

OTHER PUBLICATIONS

"z/VM V4R3.0 CP Programming Services" which is available from International Business Machines at PO Box 29570, IBM Publications, Raleigh, North Carolina 27626-0570.

Z/VM 4.2.0 General Information which is available from International Business Machines Corp. at PO Box 29570, IBM Publications, Raleigh, North Carolina 27626-0570.

* cited by examiner

VIRTUAL MACHINE OPERATING SYSTEM LAN

The invention relates generally to computer systems and deals more particularly with a local area network within a computer system to permit applications running on the computer system to communicate with each other using Internet Protocol.

Physical embodiments of local area networks ("LANs") are well known today. LANs are often privately owned and located within a single building or site. They may connect personal computers of a company to permit them to share resources such as printers and data bases, and to exchange information. A LAN may be connected to other networks such as wide-area networks to enable communication between computers on different LANS. Many applications today are able to communicate over LANs and other networks using Internet Protocol ("IP"). A key feature of Internet Protocol is its addressing scheme for devices connected to the LAN. The Internet Protocol is well known and described in publication RFC 791 (Internet Protocol DARPA Internet Program Protocol Specification, September 1981), which publication is hereby incorporated by reference as part of the present disclosure. Because this protocol is so widespread, it is preferred by many applications.

Typically, LANs comprise several "layers" of software and hardware and a tangible communication medium such as copper wires or fiber optic cables. The software and hardware may be embodied in a network adapter card or a network interface unit. A physical layer of the LAN is responsible for faithfully transmitting and receiving the actual data bits over a communication medium, i.e., ensuring that the data bits have the proper shape and magnitude. A data link layer organizes the data bits into frames, transmits the frames in proper order, recognizes the beginning and end of a frame, and processes acknowledgments. A network layer determines the routing of the frames from a source computer to a destination computer. A session layer creates sessions between different computers to allow transfer of data. A transport layer accepts data from a session, divides it into packets, passes these packets to the network layer, and verifies that the packets are received at the destination. A presentation layer is responsible for ensuring proper syntax and semantics of the frames which are transmitted. An application layer is responsible for supporting various data transfer protocols.

A "virtual machine" operating system is also well known today. It comprises a common base portion and separate user portions. In an IBM VM/ESA operating system and subsequent IBM z/VM operating system, the common base portion is called the "Control Program" or "CP" and the user portion is called a "virtual machine" or "guest". Many applications can run on each virtual machine. Each virtual machine appears to the user and his or her applications as a personal operating system. Applications running on different virtual machines can communicate with each other through the base portion. The communication may be in the form of messages conveyed by a service such as IUCV, which is based on IBM proprietary protocols. The IUCV service allows an application in one virtual machine to receive data from a storage buffer belonging to another virtual machine. IUCV does not result from any specific hardware architecture, so both applications must be designed to use IUCV protocol. The IUCV service is further described in the publication "z/VM V4R3.0 CP Programming Services" (Document Number: SC24-6001-02) which is available from International Business Machines at PO Box 29570, IBM Publications, Raleigh, N.C. 27626-0570.

It is also possible for a user application on a z/VM operating system to communicate with another application via a (tangible) LAN, using Internet Protocol. This other application can be running on the same or different z/VM base portion or running on another computer system with a different type of operating system altogether. To support this communication, a tangible network interface card ("NIC") is provided between the z/VM base portion and the tangible LAN, and previously known device driver software is provided to interface between the z/VM base portion and a subset of I/O devices within the NIC. The tangible NIC provides all functions required for establishing and transferring of data over the IP connection, i.e. (a) configuring the network interface, (b) starting the network interface, (c) sending a datagram from the device driver to the network, (d) sending a datagram from the network to the device driver, and (e) stopping the network interface. To make the interface available for data transfer, the guest operating system (or the application) must instruct the device driver to configure and start the network interface for a specific, tangible NIC. When the application has data to send to an IP destination that is accessible via this network interface, it provides a datagram to the device driver. The datagram is a TCP/IP request or response, which includes application data and an IP destination address to identify the intended target on the network. The device driver inserts a device-specific header before the datagram to describe the IP destination address and any options relevant to the device (for example, one field-in the header may indicate whether this is a unicast, multicast, or broadcast datagram). The device driver also notifies the NIC where the datagram is located in storage. When the tangible NIC is an "OSA Express" adapter in "Queued Direct Input/Output" (QDIO) mode, the device driver follows the rules of QDIO architecture to interact with the NIC. According to QDIO architecture, the device driver stores the datagram in an output buffer, updates the state of the output buffer, and executes an instruction to signal the NIC that data is ready to send to the network. The NIC retrieves the datagrams from storage and obtains the IP destination address from the header. Next, the NIC uses an internal cache table to correlate the IP destination address from the header with a "Media Access Control" ("MAC") address which identifies a destination on the LAN. A cache table is maintained by each NIC to record IP and MAC address associations detected on the LAN (when furnished by other devices). Then, the NIC sends the datagram on the (tangible) LAN to the destination NIC (or to multiple destinations in the case of a multicast or broadcast datagram). The datagram arrives at the destination, tangible NIC, where it is installed in storage owned by the target virtual machine. When the tangible NIC is an OSA Express in QDIO mode, the destination NIC installs the datagram in an input buffer, updates the state of the input buffer, and (if necessary) generates a "Program Controlled Interrupt" ("PCI") to signal the device driver that data is ready to send to the application. The destination device driver strips the device-specific header from the data and delivers the datagram to the target application.

A previously known communication technique called "HiperSockets" is also available on IBM zSeries mainframes. When z/VM is running on a zSeries mainframe with the HiperSockets feature installed, the zSeries I/O configuration may include up to four HiperSockets NIC units that operate according to a subset of QDIO architecture. Each NIC unit is formed by microcode executing on system hardware. Each NIC includes multiple I/O devices. A subset of these I/O devices from a HiperSockets NIC may be dedicated to a virtual machine. IP communication is possible (as described for OSA Express in QDIO mode) between virtual machines on the same zSeries mainframe when both virtual machines use I/O devices from the same HiperSockets NIC. IP communication is not possible between two different HiperSockets NICs.

Another virtual machine operating system is currently available from VMware, Inc. of Palo Alto, Calif. This operating system also includes a common base portion and personal user portions. The VMware (TM of VMware, Inc.) operating system includes device driver programs which are associated with respective applications. The device driver programs also simulate respective, virtual network adapters to communicate between different virtual machines in the same system (i.e. having the same base portion of the virtual machine operating system). Applications on different virtual machines in the same base system use IP to communicate with each other. The virtual network adapter performs the following functions: (a) receive data from a virtual machine device driver and pass it to another virtual network adapter, (b) receive data from another virtual network adapter and pass it to a virtual machine device driver, and (c) pass data from one virtual machine device driver to another virtual machine device driver. By using the virtual network adapter, the VMware operating system supports communication between virtual machines in the same PC or between a virtual machine and a tangible network accessible via a tangible network adapter on the PC.

An object of the present invention is to provide a simplified method for IP communication between two user applications running in separate user portions/virtual machines with a common base portion of a virtual machine operating system.

Another object of the present invention is to provide a method for IP communication of the foregoing type with minimal hardware above and beyond what is required to support the virtual machine operating system.

Another object of the present invention is to provide an improved method to allow a systems administrator or user to configure and control a LAN.

Another object of the present invention is to provide an improved method for system administrators or users to examine a network configuration.

SUMMARY OF THE INVENTION

The invention resides in a virtual machine operating system for communication between first and second applications which execute in different user portions of the virtual machine operating system and use Internet Protocol (IP). The virtual machine operating system comprises a first user portion, a second user portion and a base portion. The first user portion executes the first application and includes a first device driver for a first virtual network interface card (NIC). The second user portion executes the second application and includes a second device driver for a second virtual NIC. The base portion is shared by the first and second user portions and includes the first and second virtual NICs. The base portion maintains a table of IP addresses by which each device driver addresses its respective NIC and other, corresponding addresses by which the base portion addresses the virtual NIC. The first device driver is programmed to receive an IP datagram from the first application and pass it to the first NIC using IP. The datagram includes an IP address of the second virtual NIC and an indication that the second application should receive the datagram. The base portion is programmed to determine the other address of the second NIC based on the table and transfer the datagram to a storage location associated with the second virtual NIC or the second device driver.

DETAILED DESCRIPTION OF THE PREFERRED EMBODIMENTS

Figure 1:
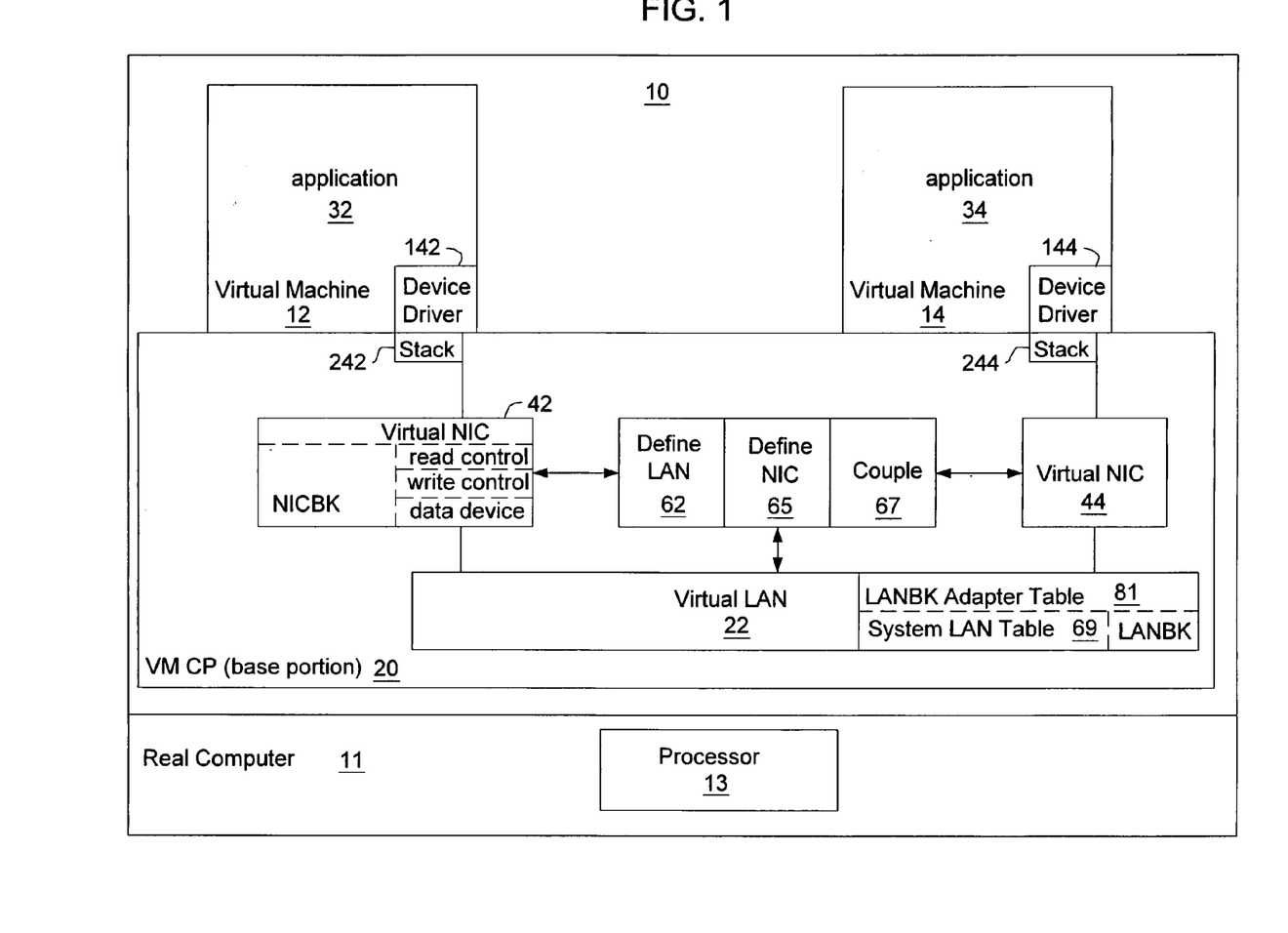
FIG. 1 is a block diagram of a virtual machine operating system including a virtual NIC and a virtual LAN according to the present invention.

Referring now to the figures in detail, wherein like reference numbers indicate like elements throughout, FIG. 1 illustrates a virtual machine operating system generally designated 10 according to the present invention. By way of example, virtual machine operating system 10 can be IBM z/VM version 4.2.0 or 4.3.0 although the present invention can be incorporated into other virtual machine operating systems as well. The details of the z/VM 4.2.0 operating system are disclosed in IBM publication "z/VM 4.2.0 General Information" (Document Number: GC24-5991-03) which is available from International Business Machines Corp. at PO Box 29570, IBM Publications, Raleigh, N.C. 27626-0570.This publication is hereby incorporated by reference as part of the present disclosure. Operating system 10 executes in a physical computer 11 such as an IBM zSeries mainframe with a processor 13 although the present invention can be incorporated into a virtual machine operating system executing on other server computers or personal computers as well. Operating system 10 comprises user portions 12 and 14 (called "virtual machines" or "guest virtual machines" in the z/VM operating system) and common base portion 20 (called "CP" in the z/VM operating system). Although not shown, typically there are many other virtual machines and associated applications which also share common base portion 20. Each user portion 12 and 14 provides standard operating system functions such as I/O, TCP/IP, etc. Each user portion 12 and 14 is capable of concurrently executing a number of different applications such as applications 32 and 34 as shown. By way of example, a copy of a Linux (TM of Linus Torvalds) operating system is running as an application on each user portion 12 and 14, although some of the operating system functions of user portions 12 and 14 are not needed by the Linux operating system as they are currently provided by the Linux operating system. Alternately, other applications such as z/VM TCP/IP can run on user portions 12 and 14 and establish IP communications between themselves and any other applications running on virtual machines which share common base portion 20.

Before the virtual LAN can be used, a virtual LAN 22 and virtual NICs 42 and 44 are defined and the virtual NICs are coupled to the virtual LAN. To define a specific virtual LAN, a systems administrator issues a DEFINE LAN command with operands to configure the virtual LAN attributes. These operands include the name of the LAN and name (userid) of the virtual machine which will own the virtual LAN, whether access the LAN is restricted by userid or unrestricted, a maximum frame size for datagrams that can be communicated over the virtual LAN and a limit on the number of virtual NICs that can be coupled to the virtual LAN. In the illustrated example, the owning application is Linux application 32. If the LAN is owned by the system, it is considered "persistent" and can only be eliminated by an explicit DETACH LAN command. If, instead, the LAN is owned by a user (such as the Linux virtual machine) the LAN is considered "transient" and may be eliminated automatically by the system when the owner logs out of the system. The maximum frame size operand indicates the amount of internal buffer storage for data transfers on the virtual LAN. The DEFINE LAN command may also include optional operands such as a LAN type and a designation that the virtual LAN has "restricted access". If a LAN type such as HiperSockets or QDIO is specified, only virtual NICs of the same type can coupled to the virtual LAN. In the case of restricted access, subsequent SET LAN commands would also include operands to indicate which user portions 12, 14, etc. can couple to this instance of the virtual LAN. Instead of creating the LAN dynamically via the DEFINE LAN command, the system administrator may elect to add a DEFINE LAN statement to the SYSTEM CONFIG file so the virtual LAN can be created for the user of application 12 or 14 during system IPL.

Figure 2:
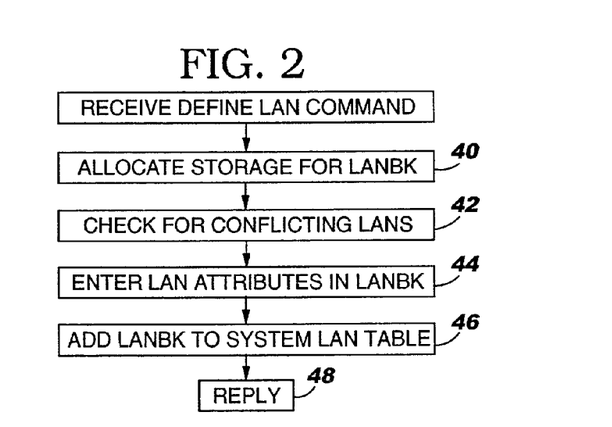
FIG. 2 is a flow chart illustrating a process implemented by the virtual machine operating system of FIG. 1 to define a virtual LAN.

As illustrated in FIG. 2, a DEFINE LAN function 63 within the base portion 20 receives the DEFINE LAN command (with the associated operands/attributes). In response, the DEFINE LAN function allocates storage for a virtual LAN control block "LANBK" (step 40) and checks all other LANBKs of other virtual LANs, if any, for a conflicting LAN name and owner (step 42). Next, the DEFINE LAN function builds a LANBK that includes these operands/attributes and will represent this virtual LAN instance (step 44). Next, the DEFINE LAN function adds the LANBK to a LAN IP Table 69 in base portion 20 along with the other LANBKs of other virtual LANs, if any, (step 46). Finally, the DEFINE LAN function replies to the invoker (i.e. the user or administrator who issued the DEFINE LAN command) that the virtual LAN has been defined (step 48).

Next, each virtual machine user, at configuration time, issues a DEFINE NIC command to define each virtual NIC 42, 44, etc. instance for each respective user portion 12, 14, etc. that will participate in the IP communications of the virtual LAN. Each virtual NIC may include a group of virtual devices such as a read control device, a write control device and one or more data devices. The DEFINE NIC command includes operands to build a virtual NIC control block "NICBK" to represent this instance of the virtual NIC. The operands include a virtual device address for the first virtual device in the group to be created for the virtual NIC and the number of virtual devices to be created for the virtual NIC. The operands may also include the type of virtual NIC, such as HiperSockets or QDIO.

Figure 3:
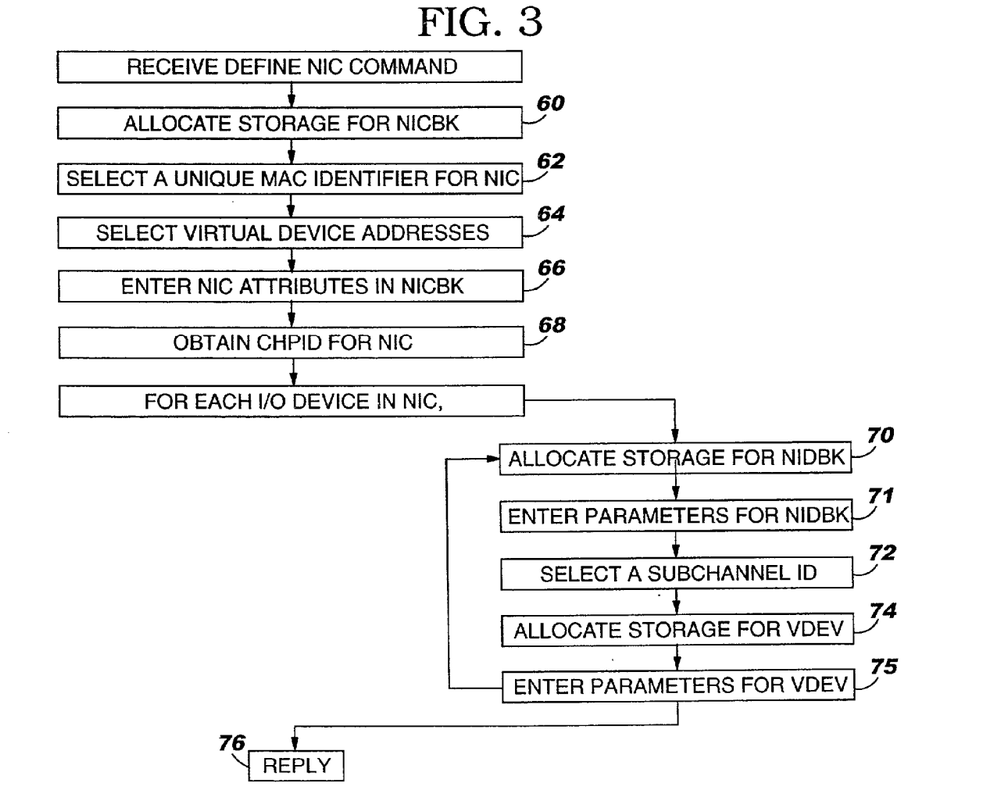
FIG. 3 is a flow chart illustrating a process implemented by the virtual machine operating system of FIG. 1 to define a virtual NIC.

As illustrated in FIG. 3, a DEFINE NIC function 65 within the base portion 20 receives the DEFINE NIC command (with the associated operands/attributes). In response, the DEFINE NIC function allocates storage for the NICBK (step 60), selects a unique Media Access Control identifier "MAC" for the NICBK (step 62) and a series of unique virtual devices addresses for the 110 devices within the virtual NIC (step 64). Each I/O device in the virtual NIC has attributes including a virtual device address (to identify the device for I/O configuration such as coupling a virtual NIC to a virtual LAN), a virtual Sub channel ID (to identify the device for I/O instructions such as Start Sub channel (SSCH)), and a Channel Path ID or "CHPID" (to associate the device with a channel in the virtual machine I/O configuration). Next, the DEFINE NIC function writes the attributes of the NIC into the NICBK (step 66) and obtains from the base portion 20 a Channel Path ID or "CHPID" (step 68). In the general architecture of zSeries, the CHPID represents a slot in a top level of an I/O device heirarchy (channel, control unit, and device). In the present invention, the device driver may use CHPID to recognize devices which belong to the same NIC (to configure and initialize the interface) or the device driver may simply use the CHPID to recognize that the configured devices have the appropriate zSeries CHPID type. Thus, the CHPID address is used in the illustrated embodiment to simulate virtual NICs as if they were tangible zSeries I/O devices. Also, in the illustrated embodiment, each virtual NIC comprises at least three virtual I/O devices: a read control device, a write control device, and at least one data device. The function of each device is as follows:

Read Control device: One "read control" device is required for each interface group. During initialization/configuration of the interface, the device driver sends this device (via SSCH with a "Write" command) a request to designate this as a "read control" device for the interface, and includes a list of "data" devices to be used for this interface. From that point on, the "read control" device is used exclusively by the device driver to read any control messages generated by the NIC (via SSCH with a "Read" command). For example, when the device driver sends a control message to register an IP address the NIC responds by generating a reply message indicating the results of that operation. In general, the NIC will respond to each control message sent by the device driver with a reply message delivered to the "read control" device.

Write Control device: One "write control" device is required for each interface group. During initialization/configuration of the interface, the device driver sends this device (via SSCH with a "Write" command) a request to designate this as a "write control" device for the interface, and includes a list of "data" devices to be used for this interface. From that point on, the "write control" device is used exclusively by the device driver to write any control message to the NIC for this interface. For example, the device driver sends a control message to the NIC to register the use of a specific IP address. The NIC responds with a control message delivered to the "read control" device.

Data device: At least one "data" device is required for each interface group. During initialization of the interface, the device driver prepares a queue structure in storage owned by the virtual machine. This queue structure points to buffer areas also in storage owned by the virtual machine. An input queue defines buffers which are prepared to receive IP datagrams from the NIC while an output queue defines buffers which are prepared to send IP datagrams to the NIC. When these queues are prepared, the device driver sends the data device (via SSCH with an "Establish QDIO Queues" CCW command) a message that communicates the queue structure to the NIC. Then the device driver sends this device (via SSCH with an "Activate QDIO Queues" command) a signal that authorizes the NIC to operate on the established queues. IP datagrams are exchanged between the device driver and the NIC by reading from, and writing into, the buffers associated with this queue structure. When data is being exchanged, the device driver presents in interruption instruction to indicate there is data available on this device for the NIC, and the NIC indicates there is data available on this device for the device driver.

For each of the virtual I/O devices, the DEFINE NIC function:

Allocates storage for a "NIDBK" control block which represents the I/O device for network functions (step 70). For example, the NIDBK includes a pointer to the chain of datagrams enqueued for receipt via this I/O device on the NIC.

Allocates a virtual device address in the range specified by the DEFINE NIC command. The virtual device address identifies the device for I/O device management. The virtual machine user enters CP commands such as DEFINE NIC to effect changes in the I/O configuration of the virtual machine. Virtual device addresses are used in this context to identify the device (or devices).

Allocates a sub channel ID in the virtual machine I/O configuration. The sub channel ID represents a slot in the lowest level of the I/O device hierarchy, and is required for proper simulation of zSeries I/O (step 72). The device driver uses the sub channel ID to identify a specific device on the NIC for zSeries I/O instructions such as SSCH (Start Sub channel).

Allocates storage for a "VDEV" control block which represents the state of the device for standard zSeries I/O functions such as start sub channel and halt sub channel (step 74). These standard I/O functions are used by the user portion 12 as part of the simulation of the virtual LAN as described below.

Finally, the DEFINE NIC function replies back to the command invoker (i.e. the virtual machine user who issued the DEFINE NIC command) that the virtual NIC has been defined (step 76).

Figure 4:
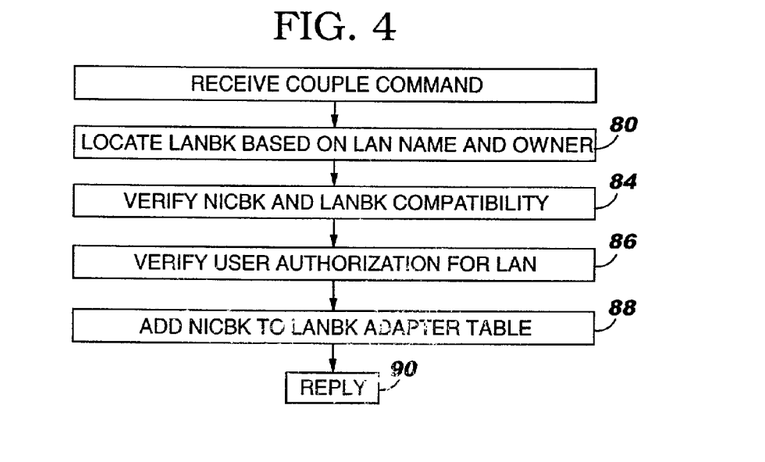
FIG. 4 is a flow chart illustrating a process implemented by the virtual machine operating system of FIG. 1 to couple together a virtual NIC and a virtual LAN.

As illustrated in FIG. 4, each virtual machine user at configuration time next issues a COUPLE command to connect or bind a virtual NIC to a virtual LAN. The COUPLE command includes operands specifying the virtual NIC and the virtual LAN to be coupled. These operands include a virtual device address of the NIC, a LAN owner, and a LAN name. In response to the COUPLE command, a COUPLE function 67 within base portion 20 locates the LANBK and NICBK for the specified virtual LAN and virtual NIC (step 80). A virtual NIC is coupled to one virtual LAN instance. If the DEFINE LAN command specifies a maximum connection number, then the COUPLE function 67 checks whether this instance of the virtual NIC is still within the limit. If the LAN was defined with a specific type, then the COUPLE function checks whether the virtual NIC is the same type (step 84). If the DEFINE LAN command indicates restricted access, then the COUPLE function checks whether user portion 12 is authorized to couple to the virtual LAN (step 86). Next, the COUPLE function adds the NICBK and LANBK for the coupled virtual NIC and virtual LAN pair to a LANBK Adapter Table 81 in base portion 20 to record the coupling (step 88). Finally, the COUPLE function reports the successful coupling to the command invoker (i.e. the virtual machine user who issued the COUPLE command) (step 90).

FIG. 1 also illustrates device drivers 142 and 144 for virtual NICs 42 and 44 respectively. Device drivers are provided by program functions within user portions 12 and 14, respectively. After the COUPLE command completes successfully, the COUPLE function 67 notifies device driver 142 to send an Initialization command to virtual NIC 42 via a TCP/IP stack 242 to initialize the virtual NIC. The TCP/IP stack is a LIFO which stores incoming commands until processed and stores outgoing commands until transmitted. (Similar events occur within virtual machine 14 and its device driver 144, TCP/IP stack 244 and virtual NIC 44.) The device driver initializes the respective virtual NIC by writing commands to the control devices via the zSeries Start Sub channel ("SSCH") instruction. The device driver writes a sequence of commands to accomplish the following tasks:

Designate which I/O devices on this virtual NIC are to be used by this device driver interface (a read-control device, a write-control device, and at least one data device).

Configure the network characteristics for this interface (for example, register an IP destination address to be associated with this interface on this virtual NIC).

Define queue structures which map the location of input and output buffers for the virtual NIC.

Provide input buffers in the queue structure which are ready to receive IP datagrams from the virtual NIC (i.e. from the virtual LAN).

Note that when an IP destination address is registered by the device driver, the IP address is installed in a LAN IP Table 69 (step 91) along with a pointer to the NIDBK of the data device for immediate use by every connected virtual NIC (This construct does not exist in a tangible LAN.)

The virtual machine user can issue a CP QUERY NIC command to learn the IP address(es) for each virtual NIC. This information is obtained by the base portion 20 by reference to the NICBK, associated NIDBKs, and LAN IP Table entries and returned to the requesting virtual machine. Likewise, the systems administrator (or other user) can issued a CP QUERY LAN to learn which virtual NICs are connected to the virtual LAN and which IP addresses are associated with each virtual NIC. This information is obtained by the base portion 20 by reference to the LAN IP Table and returned to the requesting virtual machine.

Figure 5:
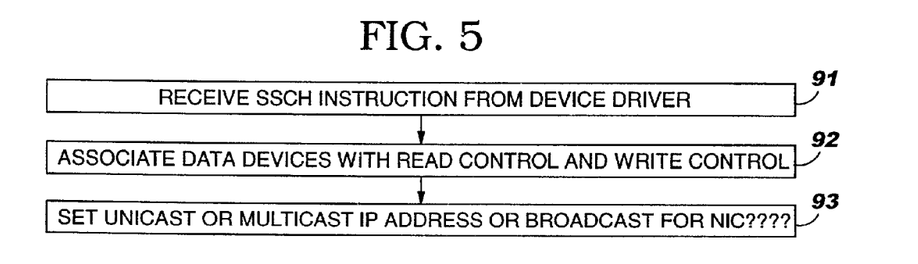
FIG. 5 is a flow chart illustrating a process implemented by the virtual machine operating system of FIG. 1 to initialize the virtual NIC.
Figure 6:
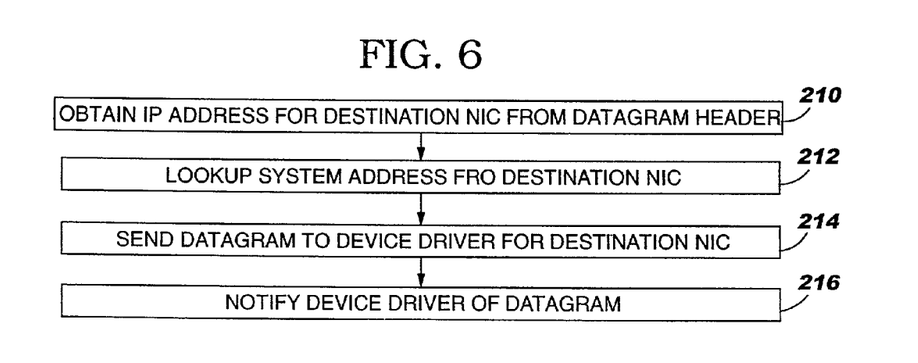
FIG. 6 is a flow chart illustrating a process implemented by the virtual machine operating system of FIG. 1 to transmit data over the virtual LAN via virtual NICs.

After all the user portions 12 have their virtual LANs and virtual NICs defined, coupled and initialized for a virtual LAN instance, IP communications can commence between applications on these user portions. FIG. 5 illustrates how application 32 communicates with application 34 using a virtual LAN using IP. The applications and their device drivers do not know that their NICs and LANs have been virtualized; they simply issue and receive the same IP commands and responses as if tangible NICs and tangible LANs were used. To begin the IP communication, application 32 sends an IP datagram to device driver 142 for virtual NIC 42. The datagram includes the IP address of the destination device(s), in this example, the Unicast IP address of virtual NIC 44. (In other instances, the communication could be multicast or broadcast mode.) The datagram also includes the name of the application that should ultimately receive the datagram, for example, application 34. The device driver 142 reads the IP address of the NIC 44 from the datagram header (step 210) and inserts a device-specific header with the NIC 44 IP destination address and the unicast, and installs the datagram in an outbound buffer in virtual machine 12. (In other instances as noted above, the communication could be multicast or broadcast.) The device driver 142 updates the state of the outbound buffer and executes an instruction to signal the virtual NIC 42 that data is available in the outbound buffer. So far, the communication has conformed to IP protocol. Next, the virtual NIC 42 obtains the IP address of the destination NIC 44 from the device specific header and uses the LAN IP Table to lookup the proprietary address of NIC 44 (step 212). (This proprietary address departs from IP protocol.) In z/VM, this proprietary address is called NIDBK. NIC 44 previously registered with the virtual LAN its IP address and corresponding NIDBK proprietary address and this correlation is maintained in the LAN IP table 69 in base portion 20. This is an efficient place to create and maintain table 69 because the registrations of the virtual NICs occur in the base portion 20; these correlations do not have to be communicated to the user portions. Next, NIC 42 acts on behalf of NIC 44 to write the datagram to an input buffer in virtual machine 14 which device driver 144 has previously defined to NIC 44 (step 214). Next, NIC 42 acts on behalf of NIC 44 to send an interruption signal to the device driver 144 in virtual machine 14 (step 216). (A decision to emulate OSA Express in QDIO mode instead of HiperSockets would result in a PCI instead of an interruption signal sent to the destination virtual machine.) In response, the destination device driver 144 receives the datagram using the same procedure that it would use if a tangible NIC and a tangible LAN had been used to transport the data, i.e., the device driver delivers it to the upper-layer protocol within the virtual machine operating system. Within virtual machine 14, the upper-layer TCP/IP components use fields in the IP datagram, which may include fields specific to the upper-layer protocol, to select application 34 as the appropriate destination for this datagram. The datagram is presented to application 34 using the same mechanism that is used for all other network traffic received via tangible NICs. The upper-layer TCP protocol is described in RFC 793 which is hereby incorporated by reference as part of the present invention.

Based on the foregoing, a virtual machine operating system LAN according to the present invention has been disclosed. However, numerous modifications and substitutions can be made without deviating from the scope of the present invention. For example, the existing implementation allows the use of configuration files (which are not described here) instead of dynamic commands to define the LAN and NIC elements. Also, addressing schemes other than NIDBK can be used within base portion 20 to address the virtual NICs. Therefore, the present invention has been disclosed by way of illustration and not limitation, and reference should be made to the following claims to determine the scope of the present invention.

The invention claimed is:

1. A computer system comprising:
   a processor; and
   a virtual machine operating system for communication between first and second applications, said first and second applications executing in different user portions of said virtual machine operating system and supporting Internet Protocol (IP), said virtual machine operating system comprising:
   a first user portion of said operating system for executing the first application and including a first device driver for a first virtual network interface card (NIC);
   a second user portion of said operating system for executing the second application and including a second device driver for a second virtual NIC;
   a base portion of said operating system, said base portion being shared by said first and second user portions and including said first and second virtual NICs, said base portion maintaining one or more tables correlating first and second IP addresses of said first and second virtual NICs, respectively to first and second buffer addresses of first and second input buffers, respectively, for said first and second device drivers, respectively; and wherein
   said first device driver is programmed to receive an IP datagram from said first application and pass it to said first virtual NIC using IP, said datagram including an IP address of said second virtual NIC and an indication that said second application should receive said datagram;
   in response to receipt of said IP datagram, said first virtual NIC is programmed to determine said second buffer address of said second input buffer based on said IP address of said second virtual NIC in said datagram and said one or more tables, and transfer said IP datagram to said second input buffer.

2. A computer system as set forth in claim 1 wherein said base portion, after transferring said IP datagram to said second input buffer, notifies said second device driver using IP that said IP datagram is available; and
   said second device driver is programmed to review said IP datagram using IP to determine tat said second application should receive notification of said IP datagram and then notify said second application that said IP datagram is available to access.

3. A computer system as set forth in claim 1 wherein each of said virtual NICs is formed by computer programming and associated storage, whereby each of said virtual NICs does not require any other hardware over and above the hardware required to execute the other parts of said virtual machine operating system.

4. A computer system as set forth in claim 1 wherein said first device driver implements IP in sending said IP datagram to said first virtual NIC, and said second device driver implements IP in receiving said IP datagram.

5. A computer system as set forth in claim 4 wherein said first device driver interacts wit said first virtual NIC as if said first virtual NIC was a tangible NIC.

6. A computer system as set forth in claim 5 wherein said second device driver interacts wit said second virtual NIC as if said second virtual NIC was a tangible NIC.

7. A computer system as set forth in claim 1 wherein each of said virtual NICs registers its IP address in said base operating system.

8. A computer system as set forth in claim 1 wherein after said first virtual NIC transfers said IP datagram to said second input buffer, said first virtual NIC notifies said second device driver that said IP datagram is waiting in said second input buffer.

9. A computer system as set forth in claim 1 wherein said first virtual NIC notifies said second device driver that said IP datagram is waiting in said second input buffer by sending an interrupt to said second device driver.

10. A computer system as set forth in claim 1 wherein said one or more tables also correlate said first and second IP addresses of said first and second virtual NICs, respectively, to first and second other, nonIP addresses associated with said first and second virtual NICs respectively, known within said base portion, and also correlate said first and second other, nonIP addresses to said first and second buffer addresses, respectively, such that said first virtual NIC is programmed to identify said second nonIP address based on said second IP address in said IP datagram, and identify said second buffer address based on said second nonIP address.

11. A computer system as set forth in claim 10 further comprising means for registering said second virtual NIC in said base portion by specifying to said base portion said second IP address and said second nonIP address for said second virtual NIC.

12. A computer system as set forth in claim 1 wherein said first and second virtual NICs and said one or more tables are independent of said first and second user portions, such that termination of said first and second user portions will not terminate said first and second virtual NICs or said one or more tables.

13. A computer system as set forth in claim 1 wherein said common base portion directly interfaces to both said first and second device drivers, such that said first virtual NIC can communicate with said second device driver without communicating through said first user portion, and said second virtual NIC can communicate with said first device driver without communicating through said second user portion.

14. A computer system as set forth in claim 13 wherein said first and second user portions do not directly interface to each other, such that said first and second user portions can only communicate with each other via said base portion.

15. A computer system as set forth in claim 1 wherein said base portion established said first user portion and said second user portion.

16. A computer system as set forth in claim 15 wherein said base portion allocated real processor function to said first user portion and said second user portion.

17. A computer system as set forth in claim 16 wherein said base portion include means for allocating a first portion of storage for said first user portion including said first input buffer, and allocating a second portion of storage for said second user portion including said second input buffer.

18. A computer system as set forth in claim 1 wherein said first input buffer is part of said first user portion, and said second input buffer is part of said second user portion.

19. A computer system as set forth in claim 1 wherein said base portion include means for allocating a first portion of storage for said first user portion including said first input buffer, and allocating a second portion of storage for said second user portion including said second input buffer.

20. A computer system comprising:
a processor; and
a virtual machine operating system for communication between first and second applications, said first and second applications executing in different user portions of said virtual machine operating system and supporting Internet Protocol (IP), said virtual machine operating system comprising:
a first user portion of said operating system for executing the first application and including a first device driver for a first virtual network interface card (NIC);
a second user portion of said operating system for executing the second application and including a second device driver for a second virtual NIC;
a base portion of said operating system, said base portion being shared by said first and second user portions and including said first and second virtual NICs, said base portion maintaining one or more tables correlating first and second IP addresses of said first and second virtual NICs, respectively to said first and second device drivers, respectively and wherein
said first device driver is programmed to receive an IP datagram from said first application and pass it to said first virtual NIC using IP, said datagram including an IP address of said second virtual NIC and an indication that said second application should receive said datagram; and
in response to receipt of said IP datagram, said first virtual NIC is programmed to determine an address of said second device driver based on said IP address of said second virtual NIC in said datagram and said one or more tables, and transfer said IP datagram to said second device driver.

21. A computer system as set forth in claim 20 wherein said common base portion directly interfaces to both said first and second device drivers, such that said first virtual NIC can communicate with said second device driver without communicating through said first user portion, and said second virtual NIC can communicate with said first device driver without communicating through said second user portion.

22. A computer system as set forth in claim 20 wherein said first and second user portions do not directly interface to each other, such that said first and second user portions can only communicate with each other via said base portion.

23. A computer system as set forth in claim 20 wherein said base portion established said first user portion and said second user portion.

24. A computer system as set forth in claim 23 wherein said base portion allocated real processor function to said first user portion and said second user portion.

25. A computer system as set forth in claim 24 wherein said base portion include means for allocating a first portion of storage for said first user portion, and allocating a second portion of storage for said second user portion.

* * * * *